United States Patent [19]

Ide et al.

[11] 4,318,961
[45] Mar. 9, 1982

[54] MAGNETIC RECORDING MEDIUM

[75] Inventors: Tosiaki Ide; Akio Watanabe; Tatsuo Uehori, all of Tokyo, Japan

[73] Assignee: TDK Electronics Co., Ltd., Tokyo, Japan

[21] Appl. No.: 200,033

[22] Filed: Oct. 23, 1980

[30] Foreign Application Priority Data

Nov. 9, 1979 [JP] Japan .................................. 54-144301

[51] Int. Cl.$^3$ .............................................. B05D 5/12
[52] U.S. Cl. .................................. 428/425.9; 427/130; 428/694; 428/900
[58] Field of Search ..................... 428/425.9, 694, 900; 427/130

Primary Examiner—Bernard D. Pianalto
Attorney, Agent, or Firm—Oblon, Fisher, Spivak, McClelland & Maier

[57] ABSTRACT

A master magnetic recording medium comprises a polymer film substrate coated with a magnetic layer comprising a binder, a metallic magnetic powder A obtained by a wet reduction and a metallic magnetic powder B obtained by a dry reduction wherein both said magnetic powders A and B have each coercive force of 1800 Oe or higher and each saturated magnetization $\sigma s$ of 130 emu/g. or higher and a ratio of said magnetic powder A to said magnetic powder B is in a range of 0.1 to 10 by weight.

4 Claims, No Drawings

MAGNETIC RECORDING MEDIUM

BACKGROUND OF THE INVENTION

1. Field of the Invention

The present invention relates to a magnetic recording medium. More particularly, it relates to a magnetic recording medium for master.

2. Description of the Prior Art

In a magnetic record reprinting method which is well-known as a contact reprinting method, original records are maintained in a master tape or sheet having a coercive force higher than the coercive force of a magnetic tape or sheet used for magnetic reprint and the master tape or sheet is brought into contact with a magnetic tape or sheet (slave) on the magnetic layers and alternative magnetic field which is remarkably higher than the coercive force of the magnetic tape or sheet is applied to perform the reprint from the master tape or sheet to the magnetic tape or sheet. In the operation, the following conditions are required; (a) the original record in the master tape or sheet is not affected by the magnetic field; (b) the reprinted record should be a faithful copy for the original record, tone qualities of the master tape or sheet and the reprinted tape or sheet are excellent. These requirements are further severe when the contact reprinting method is applied for a high density recording especially for a video tape or sheet. In usual, such purposes may be attained when the coercive force of the master tape or sheet is 2.5 times or higher than the coercive force of the slave tape or sheet. The coercive force for the high density recording such as the video tape should be about 700 Oe. Therefore, the coercive force of the master tape or sheet should be 1800 OE or higher. Moreover, the magnetic powder for the master tape or sheet should be selected from ones having excellent magnetic characteristics having low noise and high S/N ratio. When the master tape or sheet is used as the master for reprinting the high density record (shortwave record), it is important to consider the close contact of the master tape or sheet with the slave tape or sheet. If the surface smoothness of the master tape or sheet is not good, the spacing loss is large in the condition contacting with the slave tape or sheet and the reprinted degree is locally fluctuated even though the slave tape or sheet having excellent surface smoothness is used. Therefore, the master tape or sheet should have as indispensable conditions that the coercive force Hc should be 1800 Oe or higher and the surface smoothness should be superior to the surface smoothness of the slave tape or sheet and the noise is low and the S/N ratio is high to be at least 40 dB.

SUMMARY OF THE INVENTION

It is an object of the present invention to provide a master magnetic recording medium having high coercive force Hc and superior surface smoothness to that of a slave tape or sheet and low noise and high S/N ratio.

The foregoing and other objects of the present invention have been attained by providing a master magnetic recording medium which comprises a polymer film substrate coated with a magnetic layer comprising a binder, a metallic magnetic powder A obtained by a wet reduction and a metallic magnetic powder B obtained by a dry reduction wherein both said magnetic powders A and B have each coercive force of 1800 Oe or higher and each saturated magnetization $\sigma s$ of 130 emu/g. or higher and a ratio of said magnetic powder A to said magnetic powder B is in a range of 0.1 to 10 by weight.

DETAILED DESCRIPTION OF THE PREFERRED EMBODIMENTS

The master magnetic recording medium can be the master tape or sheet comprising the polymer film substrate coated with the magnetic layer comprising the binder and the metallic magnetic powder obtained by a wet reduction and the metallic magnetic powder obtained by a dry reduction. Both the metallic magnetic powders have each coercive force Hc of 1800 Oe or higher and each saturated magnetization $\sigma s$ of 130 emu/g. or higher. The ratio of the magnetic powder A obtained by the wet reduction to the metallic magnetic powder B obtained by the dry reduction is in a range of 0.1 to 10 by weight whereby the master tape or sheet for the magnetic reprinting which has high coercive force, high S/N ratio and superior surface smoothness can be obtained.

The wet reduction is well-known and for example, the metallic magnetic powder is produced by reducing a metal salt by mixing an aqueous solution of a metal salt with an aqueous solution of a reducing agent such as sodium boron hydride and heat-treating in a non-oxidizing atmosphere.

The dry reduction is well-known and for example, acicular goethite with or without the other component is dehydrated and reduced in a reducing gas atmosphere such as hydrogen gas atmosphere.

The wet reduction and the dry reduction for producing the metallic magnetic powders A and B can be selected as desired from the conventional processes.

The present invention will be illustrated by certain examples and references which are provided for purposes of illustration only and are not intended to be limiting the invention.

EXAMPLE 1

An aqueous solution of $FeSO_4.7H_2O$ and $CoSO_4.7H_2O$ at a molar ratio of 70:30 (concentration of 1 Normal) was reduced with sodium boron hydride in a magnetic field and the product was dehydrated and dried and heat-treated in hydrogen gas at 450° to 500° C. to obtain a metallic magnetic powder (A-1) by the wet reduction.

An acicular geothite containing 5 mol % of cobalt component (average length of major axis of $0.3\mu$ and acicular ratio of 7/1) was dehydrated to obtain $\alpha$-$Fe_2O_3$ containing a cobalt component. The cobalt component was further adhered at a ratio of 10 mol % and the product was reduced in hydrogen gas flow at 400° C. to obtain a metallic magnetic powder (B-1) by the dry reduction.

The magnetic characteristics of the products are as follows:

|     | Hc        | $\Sigma s$    |
| --- | --------- | ------------- |
| A-1 | 2080 (Oe) | 135 (emu/g.)  |
| B-1 | 1900 (Oe) | 150 (emu/g.)  |

The magnetic powders were treated with oleic acid and used for the preparation of the magnetic composition.

The magnetic compositions having the following components were prepared by varying the ratio of two kinds of the metallic magnetic powders (part by weight) to the following seven types.

Composition:

| | |
|---|---|
| Metallic magnetic powder (A-1) obtained by wet reduction | 200 wt. parts |
| Metallic magnetic powder (B-1) obtained by dry reduction | |
| Polyurethane (MW of 35,000): | 20 wt. parts |
| Nitrocellulose: | 15 wt. parts |
| Solvent: | 700 wt. parts |

| | Ratio of (A-1) to (B-1) . (part by weight) | | | | | | |
|---|---|---|---|---|---|---|---|
| Sample No. | No.1 | No.2 | No.3 | No.4 | No.5 | No.6 | No.7 |
| (A-1) | 0 | 20 | 60 | 100 | 140 | 180 | 200 |
| (B-1) | 200 | 180 | 140 | 100 | 60 | 20 | 0 |

The components were treated in a ball mill to disperse them for 10 hours and 10 wt. parts of triisocyanate compound as a crosslinking agent were added and the mixture was further treated in the ball mill to disperse them to prepare each magnetic composition.

The magnetic composition was coated on one surface of a polyethylene terephthalate film having a thickness of 15μ under applying magnetic field to give a dry thickness of 3.5μ and the coated film was heated to dry it. The resulting tape was treated by a calendering treatment and slitted in a width of ½ inch to prepare video tapes. The characteristics of the products are as shown in Table 1.

TABLE 1

| Sample No. | No. 1 | No. 2 | No. 3 | No. 4 | No. 5 | No. 6 |
|---|---|---|---|---|---|---|
| Hc (Oe) | 1800 | 1820 | 1850 | 1880 | 1900 | 1930 |
| Br (G) | 3000 | 3100 | 3200 | 3150 | 3200 | 3200 |
| Video output 5MHz (dB)* | +0 | +1.1 | +1.5 | +1.8 | +2.3 | +2.8 |
| S/N** | 46.0 | 45.5 | 45.2 | 44.1 | 42.2 | 41.5 |
| Surface roughness (μ) | 0.11 | 0.08 | 0.07 | 0.06 | 0.05 | 0.05 | note:
*The sample 1 is the standard as 0 dB.
**S/N ratio in 50% gray (middle level between white and black).

The surface roughness of the slave tape or sheet is usually the maximum of 0.1μ.

As shown in Table 1, the surface smoothness is improved depending upon the increase of the ratio of the metallic magnetic powder obtained by the wet reduction.

The surface roughness of the samples No. 2 to 7 was 0.1 or less. On the other hand, the S/N ratio is increased depending upon the increase of the ratio of the metallic magnetic powder obtained by the dry reduction so as to expect excellent recording characteristics. The S/N ratio of the master tape or sheet should be 40 dB or higher. In view of the above-mentioned facts, the ratio of the metallic magnetic powders A to B should be in a range of 0.1 to 10. When the ratio of A/B is lower than 0.1, the surface smoothness was inferior. When the ratio of A/B is higher than 10, the noise was too much and the S/N ratio was too low.

In accordance with the present invention, the master magnetic recording medium having excellent magnetic characteristics and surface smoothness can be obtained. Various modifications of the examples in the scope of the present invention can be clearly understood by a person skilled in the art. For example, the thermosettable polyurethane was used as the binder and was crosslinked in the example. Thus, the other thermosettable resins can be used and certain thermoplastic resin can be also used as the binder.

We claim:

1. A master magnetic recording medium which comprises a polymer film substrate coated with a magnetic layer comprising a binder, a metallic magnetic powder A obtained by a wet reduction and a metallic magnetic powder B obtained by a dry reduction wherein both said magnetic powders A and B have each coercive force of 1800 Oe or higher and each saturated magnetization $\sigma_s$ of 130 emu/g. or higher and a ratio of said magnetic powder A to said magnetic powder B is in a range of 0.1 to 10 by weight.

2. The master magnetic recording medium according to claim 1 wherein said binder is a thermosettable polyurethane.

3. The master magnetic recording medium according to claim 2 wherein said binder is nitrocellulose.

4. The master magnetic recording medium according to claim 1, 2 or 3 wherein the surface of said magnetic layer was processed by a calender treatment.

* * * * *